(12) United States Patent
Uselton

(10) Patent No.: US 8,376,242 B1
(45) Date of Patent: Feb. 19, 2013

(54) WIRELESS USER INTERFACE FOR AN HVAC CONTROLLER AND METHOD OF OPERATING THE SAME

(75) Inventor: Robert B. Uselton, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 2059 days.

(21) Appl. No.: 10/975,718

(22) Filed: Oct. 28, 2004

(51) Int. Cl.
G05D 23/00 (2006.01)
B60H 1/00 (2006.01)
G01M 1/38 (2006.01)

(52) U.S. Cl. .......................... 236/51; 236/91 F; 700/276

(58) Field of Classification Search .................... 236/51, 236/47, 91 F; 700/276, 277, 278, 300; 165/208, 165/209
See application file for complete search history.

(56) References Cited

U.S. PATENT DOCUMENTS

| | | | |
|---|---|---|---|
| 4,899,129 A * | 2/1990 | MacFadyen et al. | 340/310.11 |
| 5,595,342 A * | 1/1997 | McNair et al. | 236/51 |
| 5,927,599 A | 7/1999 | Kath | |
| 6,116,512 A | 9/2000 | Dushane et al. | |
| 6,213,404 B1 | 4/2001 | Dushane et al. | |
| 6,275,166 B1 | 8/2001 | del Castillo et al. | |
| 6,437,692 B1 | 8/2002 | Petite et al. | |
| 6,449,533 B1 | 9/2002 | Mueller et al. | |
| 6,483,906 B1 | 11/2002 | Iggulden et al. | |
| 6,502,758 B2 | 1/2003 | Cottrell | |
| 6,508,407 B1 | 1/2003 | Lefkowitz et al. | |
| 6,522,954 B1 | 2/2003 | Kummerer et al. | |
| 6,542,076 B1 | 4/2003 | Joao | |
| 6,564,056 B1 | 5/2003 | Fitzgerald | |
| 6,581,846 B1 | 6/2003 | Rosen | |
| 6,587,046 B2 | 7/2003 | Joao | |

FOREIGN PATENT DOCUMENTS

JP 2003009256 A * 1/2003

* cited by examiner

*Primary Examiner* — Chen Wen Jiang

(57) ABSTRACT

A wireless user interface for an HVAC controller, a method of operating a wireless user interface for an HVAC controller and an HVAC system incorporating the wireless user interface or the method. In one embodiment, the wireless user interface includes: (1) a chassis having a display and at least one control button and containing a temperature sensor and wireless communication circuitry and (2) a microcontroller configured to cause the wireless communication circuitry to generate outbound data packets for wireless transmission to the HVAC controller containing temperature readings from the temperature sensor and when the at least one control button is pressed and receive inbound data packets from the HVAC controller that determine a content of the display.

18 Claims, 3 Drawing Sheets

WIRELESS USER INTERFACE FOR AN HVAC CONTROLLER AND METHOD OF OPERATING THE SAME

TECHNICAL FIELD OF THE INVENTION

The present invention is directed, in general, to heating/ventilation/air conditioning (HVAC) systems and, more specifically, to a wireless user interface for an HVAC controller and a method of operating the interface.

BACKGROUND OF THE INVENTION

Control of central HVAC systems has long been a topic of innovation. Early HVAC systems had only the most rudimentary control: a manual on/off switch. Later systems were fitted with a bimetal thermostat, which afforded them automatic, temperature-dependent control.

Today's thermostats do much more than simply instruct the HVAC system to turn on or off. They allow a user to set the mode of the HVAC system (e.g., heating, cooling or ventilation). They can provide zones of separate thermostatic control. More sophisticated electronic thermostats typically provide setback, which allows setpoint temperatures to vary depending upon time of day or day of week. Some electronic thermostats can give temperature histories, monitor energy usage and even present a graphical image of the surrounding premises to allow individual room control.

A bundle of wires conventionally couples thermostats to the HVAC systems they control. The wires have to be designed and built in to new construction or retrofitted (sometimes with great difficulty) into existing construction, which somewhat limits where thermostats can be placed. Relocating thermostats involves rerouting their associated wires or routing new ones. Thus it is rare that thermostats, once placed, are ever moved.

In an effort to allow a user to place a thermostat where he wants it, the prior art has introduced wireless thermostats that communicate by infrared light. These thermostats are afforded only rudimentary functionality, since they rely solely on batteries for their power. Unfortunately, despite their effort to keep power requirements at a minimum, their batteries require frequent replacement. These thermostats were also constrained by line-of-sight by virtue of their dependence upon light as their carrier.

The prior art has also introduced thermostats that offer sophisticated control features and communicate wirelessly by radio frequency signals. However, these thermostats require external power sources and interconnecting wires to provide sufficient power to the thermostats to support their sophistication. To call these thermostats "wireless" would be a misnomer.

As powerful as these thermostats were, a need continues to exist for evermore control features and flexibility. What is needed in the art is a more powerful and flexible wireless remote control for an HVAC system. What is further needed in the art is a wireless remote control that requires less maintenance (i.e., battery replacement).

SUMMARY OF THE INVENTION

The motivation of the prior art has been to make wireless remote controls evermore complex and powerful to enable them to execute evermore complex and powerful control algorithms. Unfortunately, increasing the complexity and power of a wireless remote control increases its power consumption and cost. Rather than follow conventional thought, the present invention takes a contrary approach. The complexity and power required to control the HVAC system instead transferred to an HVAC controller that is physically wired to the HVAC system. Because the HVAC controller is wired to the HVAC system, it can be as complex, powerful and power-consumptive as needed. This frees the wireless remote control to become a mere wireless user interface to the HVAC controller, relaying user commands and temperature readings to the HVAC controller for further processing and control.

To ensure its complete portability, the wireless user interface is completely wireless and requires no wires whatsoever, either for control or for power. Further, the wireless user interface does not require batteries or, if batteries are used, does not solely rely on batteries for power.

Therefore, to address the above-discussed deficiencies of the prior art, the present invention provides in one aspect a wireless user interface for an HVAC controller. In one embodiment, the wireless user interface includes: (1) a chassis having a display and at least one control button and containing a temperature sensor and wireless communication circuitry and (2) a microcontroller configured to cause the wireless communication circuitry to generate outbound data packets for wireless transmission to the HVAC controller containing temperature readings from the temperature sensor and when the at least one control button is pressed and receive inbound data packets from the HVAC controller that determine a content of the display.

In another aspect, the present invention provides a method of operating a wireless user interface for an HVAC controller. In one embodiment, the method includes: (1) pressing at least one control button on a chassis having a display and containing a temperature sensor and wireless communication circuitry, (2) generating outbound data packets for wireless transmission to the HVAC controller containing temperature readings from the temperature sensor and when the at least one control button is pressed and (3) receiving inbound data packets from the HVAC controller that determine a content of the display.

In yet another aspect, the present invention provides an HVAC system. In one embodiment, the HVAC system includes: (1) an air handler having heating, ventilation and air conditioning capability, (2) an HVAC controller having a processor and memory and configured to provide commands selectively to activate the heating, ventilation and air conditioning capability and (3) a wireless user interface for an HVAC controller having: (3a) a chassis having a display and at least one control button and containing a temperature sensor and wireless communication circuitry and (3b) a microcontroller configured to cause the wireless communication circuitry to generate outbound data packets for wireless transmission to the HVAC controller containing temperature readings from the temperature sensor and when the at least one control button is pressed and receive inbound data packets from the HVAC controller that determine a content of the display, the HVAC controller using the outbound data packets to calculate how the air handler is to be controlled.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
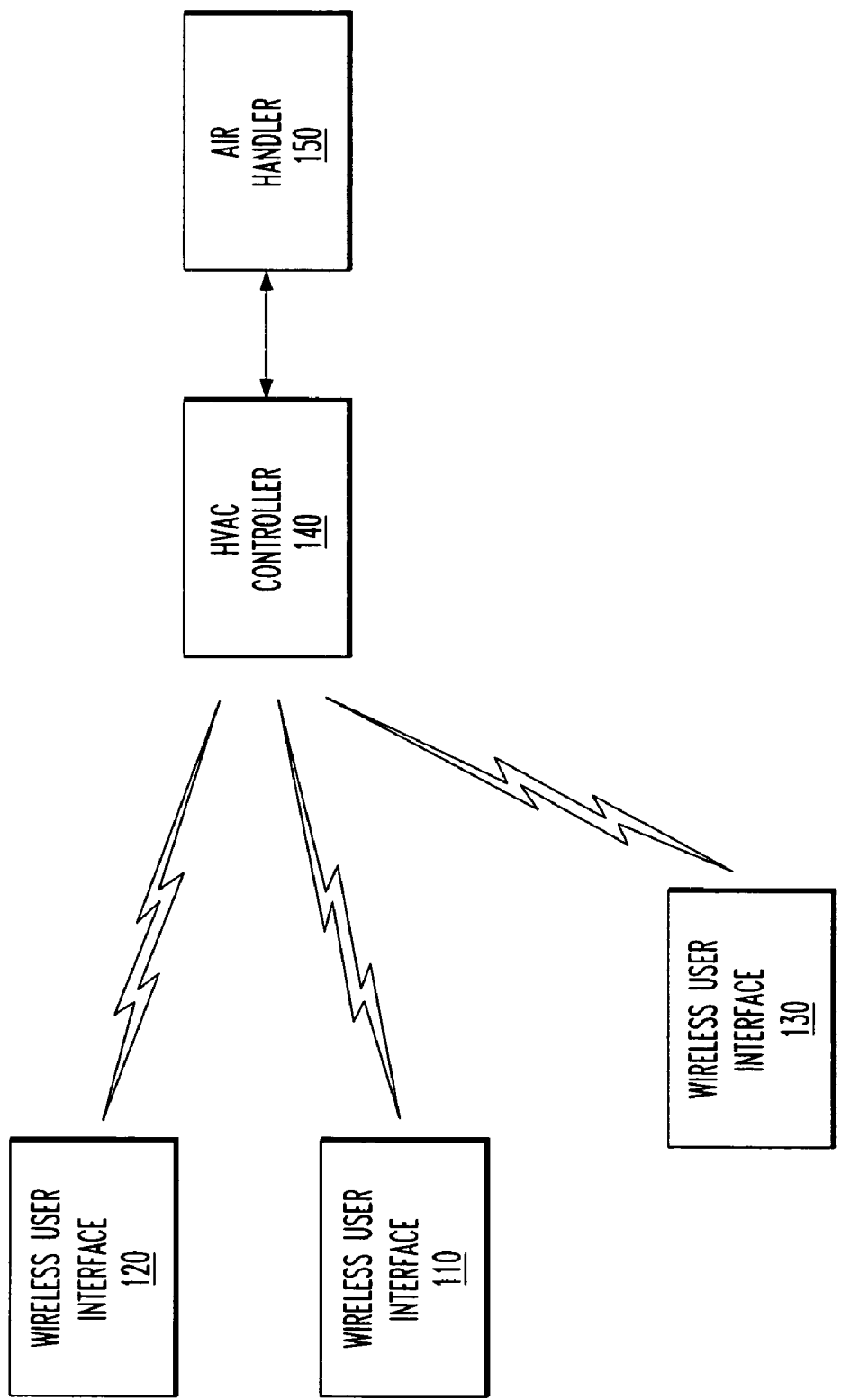
FIG. 1 illustrates a block diagram of one embodiment of an HVAC system incorporating a wireless user interface constructed, or a method carried out, according to the principles of the present invention.

Referring initially to FIG. 1, illustrated is a block diagram of one embodiment of an HVAC system incorporating a wireless user interface constructed, or a method carried out, according to the principles of the present invention.

The HVAC system is illustrated as having a plurality of wireless user interfaces 110, 120, 130. The wireless user interfaces 110, 120, 130 may correspond to different zones of heating, ventilation and cooling in the HVAC system or may belong to a single zone. Though not separately referenced in FIG. 1, each wireless user interface 110, 120, 130 has a chassis that, in turn, has a display and at least one control button. Though not visible in FIG. 1, each wireless user interface 110, 120, 130 contains a temperature sensor, wireless communication circuitry and a microcontroller, which is a relatively low power processor of relatively limited capability.

The HVAC system further includes an HVAC controller 140. The HVAC controller 140 is wirelessly coupled to the wireless user interfaces 110, 120, 130 but is powered by wire. In contrast to the wireless user interfaces 110, 120, 130, the HVAC controller 140 has a processor of sufficient capability to execute HVAC control algorithms and, if such is desired, generate the graphical user interfaces that may be displayed on the various wireless user interfaces 110, 120, 130. The HVAC controller 140 further has wireless communication circuitry and memory and is charged with the responsibility of providing the commands selectively to activate the heating, ventilation and air conditioning capability that the HVAC system has. It is ultimately the HVAC controller that decides when to start and stop the HVAC system and the modes in which it should operate.

According to the principles of the present invention, the wireless user interfaces 110, 120, 130 are able to use a microcontroller (and do not have to use a full processor) because they are not responsible for executing HVAC control algorithms and generating sophisticated graphical user interfaces. Instead, as will be seen, the wireless user interfaces 110, 120, 130 are "thin" interfaces that use data packets to transmit temperature readings and the identities of control buttons being pressed by a user to the HVAC controller 140. The HVAC controller 140 likewise uses data packets to transmit temperature "read" requests to the wireless user interfaces 110, 120, 130 and data suitable for display on the display of the wireless user interfaces 110, 120, 130.

Because the HVAC controller primarily bears the computational burden of controlling the HVAC system, the wireless user interfaces 110, 120, 130 consume relatively little power and cost less to manufacture. The relatively low power consumption allows the wireless user interfaces 110, 120, 130 to require less frequent battery changes or, most advantageously, not to require battery changes at all. The latter can be achieved through a combination of photovoltaic cells and a rechargeable battery or capacitor (sometimes called a "super cap").

The HVAC controller 140 may be self-configuring. That is, the HVAC controller may be capable of determining the identity of the HVAC system or systems to which it is coupled and may be further capable of determining how many wireless user interfaces it is to be driving, separately identifying those wireless user interfaces so they may be individually driven and locating those wireless user interfaces within the premises. The latter is advantageous for determining the location at which a particular wireless user interface is taking a temperature reading and, consequently, the particular HVAC system that is to be controlled to effect a temperature change at that location. The HVAC controller 140 may be self-configuring in other respects. Those skilled in the art understand that the present invention is not limited to a particular kind of self-configuration capability and fully encompasses HVAC controllers that are not self-configuring.

An air handler 150 is illustrated as being wired to the HVAC controller 140. The illustrated embodiment of the air handler 150 has heating, ventilation and air conditioning capability that is selectably engageable by way of commands provided by the HVAC controller 140. The air handler 150 may be of any conventional or later-developed type. The present invention is not limited to air handlers having full heating, ventilation and air conditioning capability, however. Those having fewer capabilities, such as hydronic heating systems that lack an air handler, fall within the scope of the present invention.

Figure 2:
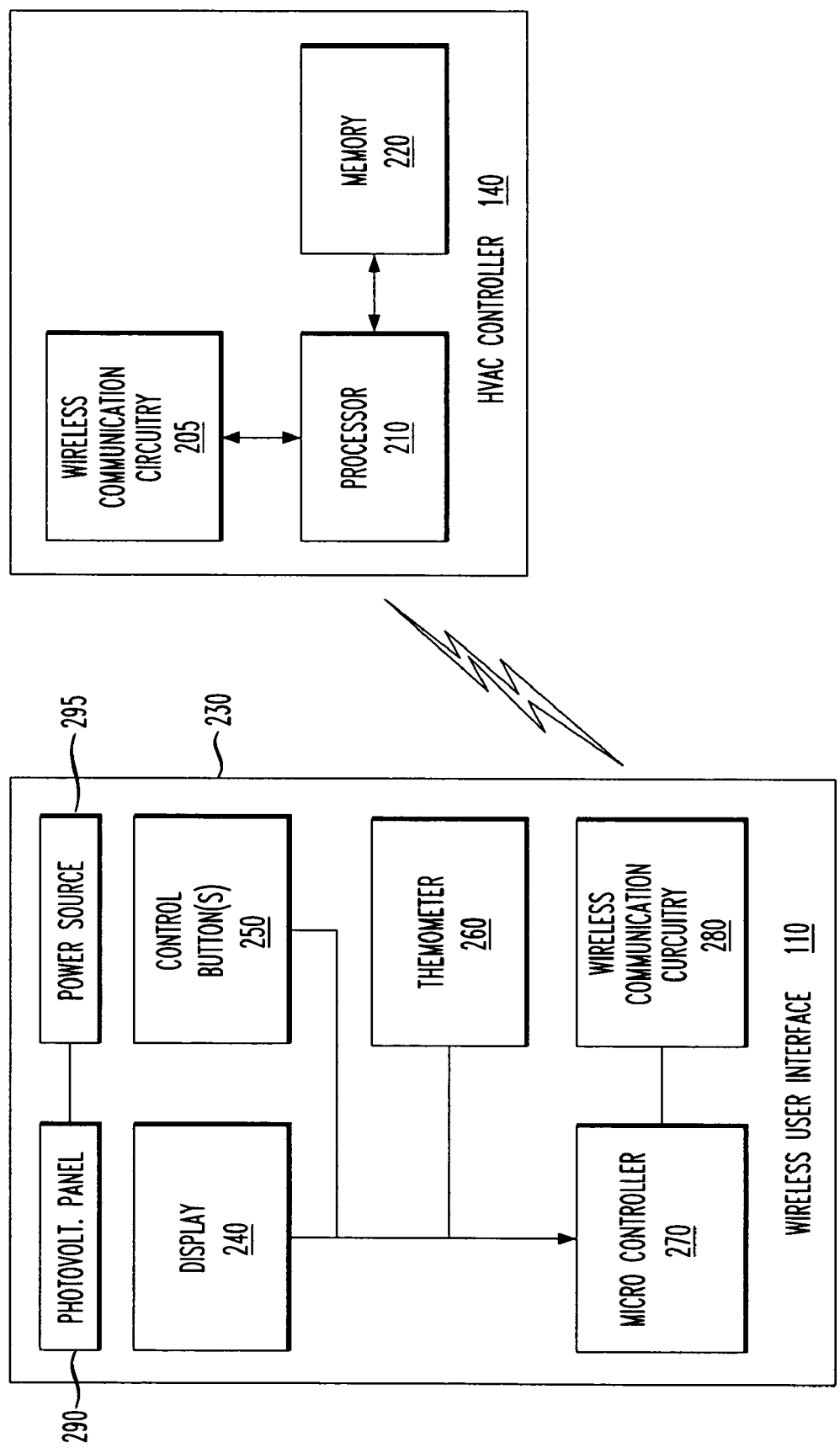
FIG. 2 illustrates a block diagram of one embodiment of a wireless user interface for an HVAC controller constructed according to the principles of the present invention.

Turning now to FIG. 2, illustrated is a block diagram of one embodiment of a wireless user interface (e.g., the wireless user interface 110 of FIG. 1) for an HVAC controller constructed according to the principles of the present invention. As stated above, the HVAC controller contains wireless communication circuitry 205, a processor 210 and a memory 220. The processor is of adequate power to execute HVAC control algorithms and capable of defining and transmitting the information that the wireless user interface 110 displays.

The wireless user interface 110 has a chassis 230 that has a display 240 and one or more control buttons 250. The display 240 and control button(s) 250 are coupled by a bus (not referenced) to a microcontroller 270 such that the microcontroller 270 can provide information to be displayed to the display 240 and receive indications of user input via the control button(s) 250.

In one embodiment, the display 240 is a conventional liquid crystal display (LCD). The LCD may be one or more seven-segment LCDs or may be a bitmapped LCD screen capable of displaying graphical information in bitmapped or vector form and effecting a graphical user interface for the benefit of a user. In another embodiment, the display 240 may be touch-sensitive and therefore constitute the control button(s) 250 as well as the display 240. In the illustrated embodiment, however, the control button(s) 250 are separate from the display.

A temperature sensor 260 is coupled to the microcontroller 270. In the illustrated embodiment, the temperature sensor 260 is conventional and readable by the microcontroller 270 to provide temperature readings that can be encapsulated in data packets and transmitted to the HVAC controller 140 for use in an HVAC control algorithm.

Wireless communication circuitry 280 is coupled to the microcontroller 270. The wireless communication circuitry 280 is a radio transceiver having the capability of (1) receiving data in digital form from the microcontroller 270 and transmitting it to the wireless communication circuitry 205 of the HVAC controller 140 in the form of outbound data packets and (2) receiving inbound data packets and sending corresponding data in digital form to the microcontroller 270.

Several types of suitable wireless communication circuitry 280 are currently commercially available. One is referred to as Bluetooth; another is referred to as Zigbee. For a comparison of Bluetooth and Zigbee see, e.g., http://www.zigbee.org/resources/documents/ZigBeeBluetoothComparison4.pdf, incorporated herein by reference. In general, wireless local area network (WLAN) circuitry adhering to the IEEE 802.11, or "WiFi," standard is suitable. In fact, systems-on-a-chip (SoCs) are currently commercially available that combine the microcontroller 270 and the wireless communication circuitry 280 (along with some memory) on a single physical substrate, providing an efficient, low-power platform for realizing the wireless user interface 110. Those skilled in the pertinent art should understand that later-developed wireless communication circuitry 280 capable of supporting the transmission of digital data packets certainly fall within the scope of the present invention.

In the illustrated embodiment of the wireless user interface 110, a photovoltaic panel 290 and a rechargeable power source 295 are coupled to the chassis 230 and to the microcontroller 270 via a power bus (not shown). The rechargeable power source may be a capacitor or a battery. Alternatively, the wireless user interface 110 may be powered by a nonrechargeable battery (not shown).

Figure 3:
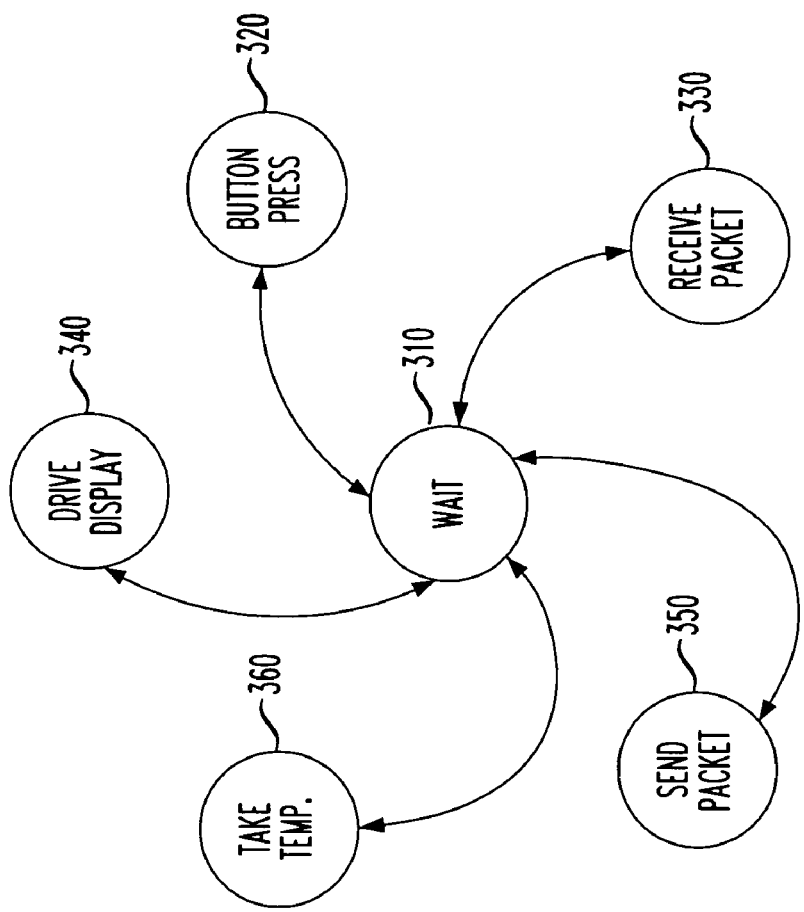
FIG. 3 illustrates a state diagram of one embodiment of a method of operating a wireless user interface for an HVAC controller carried out according to the principles of the present invention.

Turning now to FIG. 3, illustrated is a state diagram of one embodiment of a method of operating a wireless user interface for an HVAC controller carried out according to the principles of the present invention.

In the illustrated embodiment, a wait state 310 is the default state for the wireless user interface when no activity is taking place. The wait state 310 may advantageously be a sleep mode in which minimal power is consumed.

If the user presses a button, a button press state 320 is entered (probably by the issuance of an interrupt to the microcontroller). In the button press state 320, the microcontroller identifies the button that has been pressed (assuming the wireless user interface has more than one button) and transmits digital data identifying that button to the wireless communication circuitry. The wireless communication circuitry in turn transmits one or more outbound data packets (in a send packet state 350) to the HVAC controller indicating that the identified button has been pressed (perhaps, for example, changing the contents of the display to present a sub-menu). An HVAC control algorithm executing in the HVAC controller may act upon the pressing of the button to take some action with respect to controlling the HVAC system. In an alternative embodiment, the microcontroller receives multiple presses of one or more buttons and causes the wireless communication circuitry to transmit the multiple presses as one or more outbound data packets.

In addition to receiving and conveying button presses to the HVAC controller, the wireless user interface functions as a temperature sensor. The temperature sensor function can be achieved in a number of ways. The HVAC controller may, for example, transmit a data packet to the wireless user interface requesting a temperature reading. Prompted by receipt of the inbound data packet (in a receive packet state 330), the microcontroller takes the temperature (in a take temperature state 360) and relays that temperature back to the HVAC controller as an outbound data packet (the send packet state 350) via the wireless communication circuitry. Alternatively, the wireless user interface may initiate a temperature reading on its own, perhaps periodically. In such case, the take temperature state 360 is entered without being prompted by an inbound data packet. The temperature is taken and the send packet state 350 is entered to transmit a corresponding outbound data packet to the HVAC controller.

Another function of the wireless user interface is to display information to a user by way of its display. Rather than burden the microcontroller with the task of composing the contents of the display, the present invention advantageously tasks the HVAC controller with it. Accordingly, inbound data packets containing digital data to be displayed on the display may be occasionally and perhaps periodically received (in the receive packet state 330). In response, the microcontroller enters a drive display state 340 in which the digital data are caused to be displayed on the display. The display may be capable of displaying only textual (alphanumeric) data, in which case the digital data constitutes one or more strings of text. The display may alternatively be capable of displaying graphics, in which case the digital data in all likelihood constitutes a bitmap or vector graphics. Those skilled in the pertinent art are familiar with the various ways in which displays can be driven to provide information to a user. The broad scope of the present invention is not limited to a particular way of displaying such information.

Although the present invention has been described in detail, those skilled in the art should understand that they can make various changes, substitutions and alterations herein without departing from the spirit and scope of the invention in its broadest form.

What is claimed is:

1. A wireless user interface for an HVAC controller, comprising:
   a chassis supporting wireless communication circuitry, a temperature sensor, at least one control button, a display, a photovoltaic panel and a rechargeable power source, said photovoltaic panel and said rechargeable power source cooperating to provide power to said wireless user interface; and
   a microcontroller configured to cause said wireless communication circuitry to generate outbound data packets for wireless transmission to said HVAC controller that contain temperature readings from said temperature sensor and commands based on input provided via said at least said one control button and receive inbound data packets from said HVAC controller that determine a content of said display, wherein said microcontroller generates said outbound data packets only when prompted by receipt of one of said inbound data packets or when said at least one control button is pressed.

2. The wireless user interface as recited in claim 1 wherein said display is a liquid crystal display configured to display graphics.

3. The wireless user interface as recited in claim 1 wherein said HVAC controller is self-configuring and said inbound data packets include notifications of low power availability in said wireless user interface.

4. The wireless user interface as recited in claim 3 wherein said rechargeable power source is selected from the group consisting of:
   a capacitor, and
   a battery.

5. The wireless user interface as recited in claim 1 wherein said wireless communication circuitry is Bluetooth circuitry.

6. The wireless user interface as recited in claim 1 wherein said HVAC controller controls a plurality of zones and said wireless user interface corresponds to only one of said plurality of zones.

7. A method of operating a wireless user interface for an HVAC controller, comprising:
  pressing at least one control button on a chassis having a display and containing a temperature sensor and wireless communication circuitry;
  generating outbound data packets for wireless transmission to said HVAC controller containing temperature readings from said temperature sensor and when said at least one control button is pressed; and
  receiving inbound data packets from said HVAC controller that determine a content of said display, wherein said generating is carried out only when prompted by receipt of one of said inbound data packets or when said at least one control button is pressed.

8. The method as recited in claim 7 wherein said display is a liquid crystal display configured to display graphics.

9. The method as recited in claim 7 wherein said chassis further has a photovoltaic panel and a rechargeable power source coupled thereto.

10. The method as recited in claim 9 wherein said rechargeable power source is selected from the group consisting of:
  a capacitor, and
  a battery.

11. The method as recited in claim 7 wherein said wireless communication circuitry is Bluetooth circuitry.

12. The method as recited in claim 7 wherein said HVAC controller controls a plurality of zones and said wireless user interface corresponds to only one of said plurality of zones.

13. An HVAC system, comprising:
  an air handler having heating, ventilation and air conditioning capability;
  an HVAC controller having a processor and memory and configured to provide commands selectively to activate said heating, ventilation and air conditioning capability; and
  a wireless user interface for an HVAC controller, including:
    a chassis having a display and at least one control button and containing a temperature sensor and wireless communication circuitry, and
    a microcontroller configured to cause said wireless communication circuitry to generate outbound data packets for wireless transmission to said HVAC controller containing temperature readings from said temperature sensor and when said at least one control button is pressed and receive inbound data packets from said HVAC controller that determine a content of said display, said HVAC controller using said outbound data packets to calculate how said air handler is to be controlled, wherein said microcontroller generates said outbound data packets only when prompted by receipt of one of said inbound data packets or when said at least one control button is pressed.

14. The HVAC system as recited in claim 13 wherein said display is a liquid crystal display configured to display graphics.

15. The HVAC system as recited in claim 13 wherein said chassis further has a photovoltaic panel and a rechargeable power source coupled thereto and to said microcontroller.

16. The HVAC system as recited in claim 15 wherein said rechargeable power source is selected from the group consisting of:
  a capacitor, and
  a battery.

17. The HVAC system as recited in claim 13 wherein said wireless communication circuitry is Bluetooth circuitry.

18. The HVAC system as recited in claim 13 wherein said HVAC controller controls a plurality of zones and said wireless user interface corresponds to only one of said plurality of zones.

* * * * *